(No Model.)

E. Y. MOORE.
DOOR HANGER.

No. 445,354. Patented Jan. 27, 1891.

Witnesses
Geo. W. Young
N. E. Oliphant

Inventor
E. Y. Moore
By H. G. Underwood
Attorney

THE NORRIS PETERS CO., PHOTO-LITHO., WASHINGTON, D. C.

UNITED STATES PATENT OFFICE.

EDWARD Y. MOORE, OF MILWAUKEE, WISCONSIN.

DOOR-HANGER.

SPECIFICATION forming part of Letters Patent No. 445,354, dated January 27, 1891.

Application filed June 23, 1890. Serial No. 356,408. (No model.)

*To all whom it may concern:*

Be it known that I, EDWARD Y. MOORE, of Milwaukee, in the county of Milwaukee, and in the State of Wisconsin, have invented certain new and useful Improvements in Door-Hangers; and I do hereby declare that the following is a full, clear, and exact description thereof.

In my patent, No. 394,873, of December 18, 1888, and No. 426,298, of April 22, 1890, I have shown door-hangers having the sheaves thereof provided with loose axles held against lateral movement by means extraneous to said sheaves; and the object of the present invention is to lock the loose axles in the sheaves against lateral movement, as will be hereinafter described, with reference to the accompanying drawings, and subsequently claimed.

Figure 1:
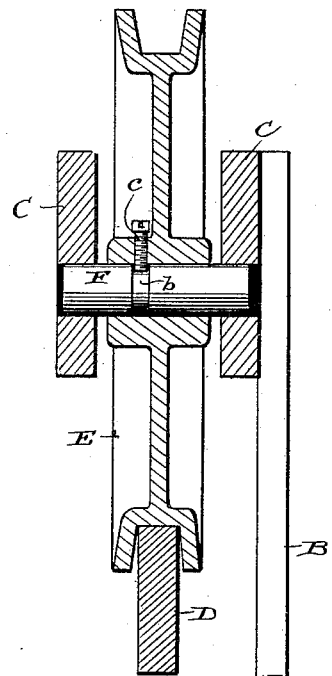
Figure 2:
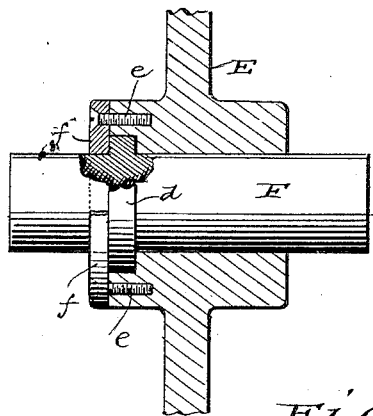
Figure 3:
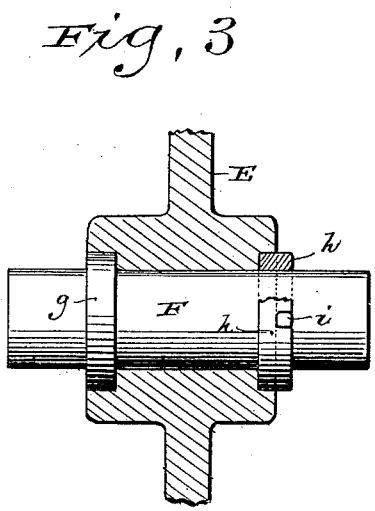
Figure 4:
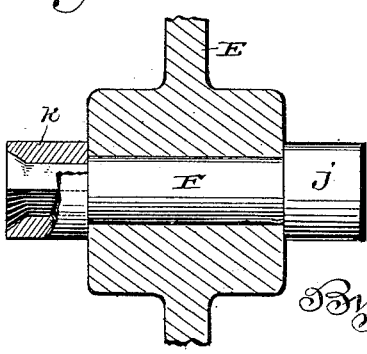

In the drawings, Figure 1 represents a vertical transverse section of a door-hanger, and illustrates one form of my invention; and Figs. 2 to 4, inclusive, are detail sectional views illustrating as many other forms of said invention.

Referring by letter to Fig. 1 of the drawings, A represents a portion of a door; B, the yoke of a hanger connected to the door; C, the rider-bars of the door-hanger; D, a track; E, a sheave on the track, and F the axle loose in the sheave and having its bearings in the rider-bars. The loose axle F (shown in Fig. 1) is provided with an annular groove $b$, and a screw $c$, arranged in an opening in the hub of the sheave E, extends into the groove to lock said axle in the sheave against lateral movement.

In Fig. 2 I show the hub of the sheave E recessed at one end to receive an annular shoulder $d$ on the loose axle F, and by screws $e$ or other suitable means a washer $f$ is retained on said hub against said shoulder.

In Fig. 3 I show the hub of the sheave E recessed at both ends. One of the recessed ends of the sheave-hub receives an annular shoulder $g$ on the loose axle F, and the other recessed end of said hub receives a collar $h$, slipped onto said axle, the latter being provided with a pin $i$ for engagement with a notch in the collar, whereby the several parts are held in their relative positions.

In Fig. 4 I show the loose axle F provided at one end with an annular head $j$ for engagement with one of the rider-bars of a door-hanger, the other end of said axle being reduced and squared to receive a square-bored sleeve $k$, into which said squared end of the axle is upset for the purpose of holding the sleeve rigidly in place to engage with the other rider-bar of the door-hanger.

By the construction described in connection with Figs. 2 to 4 of the drawings I obtain the same result specified in connection with Fig. 1 of said drawings, and various other means may be employed to accomplish this result without departure from the spirit of my invention.

Having thus described my invention, what I claim as new, and desire to secure by Letters Patent, is—

A door-hanger sheave, an axle loosely mounted therein, and holding devices carried with the sheave and axle, whereby the latter is locked against lateral movement in the former, substantially as set forth.

In testimony that I claim the foregoing I have hereunto set my hand, at Milwaukee, in the county of Milwaukee and State of Wisconsin, in the presence of two witnesses.

EDWARD Y. MOORE.

Witnesses:
H. G. UNDERWOOD,
WM. KLUG.